3,428,673
NITRATION OF 4-ACETAMIDOBENZOIC ACID

James Edgar Mallonee, Wilmington, Del., assignor to E. I. du Pont de Nemours and Company, Wilmington, Del., a corporation of Delaware
No Drawing. Continuation-in-part of application Ser. No. 245,413, Dec. 18, 1962. This application June 3, 1964, Ser. No. 372,361
U.S. Cl. 260—518
Int. Cl. C07c *101/48*
3 Claims

ABSTRACT OF THE DISCLOSURE

Process for the preparation of 4-acetamido-3-nitrobenzoic acid by dissolving 4-acetamidobenzoic acid in sulfuric acid and nitrating by adding mixed sulfuric and nitric acids. The 4-acetamido-3-nitrobenzoic acid may optionally be hydrolyzed to 4-amino-3-nitrobenzoic acid without isolation from the reaction mass.

---

This aplication is a continuation-in-part of my copending application Ser. No. 245,413, filed Dec. 18, 1962, now abandoned.

This invention relates to an improvement in the preparation of 4-acetamido-3-nitrobenzoic acid precursor to 4-amino-3-nitrobenzoic acid.

The heretofore described procedures for the nitration of acetyl-p-aminobenzoic acid lack much detail, but all such processes involve the addition of the 4-acetamidobenzoic acid as a dry powder to fuming nitric acid (that is nitric acid containing 10 or less parts of water). The addition of dry powder to fuming nitric acid is hazardous and although it is possible to carry out such a process on a laboratory scale, carrying out such a process on a commercial scale is dangerous for where large quantities are involved control of such a reaction is difficult and in most cases impossible.

It is the object of this invention to provide a safe and convenient process for the nitration of 4-acetamidobenzoic acid which gives good yields of a relatively pure product. A further object of the invention is to provide a process in which the 4-acetamido-3-nitrobenzoic acid may be hydrolyzed to the 4-aminonitrobenzoic acid without isolation from the nitration mass.

The process of the present invention comprises carrying out the nitration of 4-acetamidobenzoic acid by dissolving it in sulfuric acid of from 86 to 92 percent concentration (preferably 88 to 90 percent). To the solution is added mixed nitric acid and sulfuric acid (which may be in a commercially available mixture of the two) in a sufficient quantity to provide from 1 to 1.2 moles of nitric acid per mole of 4-acetamidobenzoic acid. Usually the mixed acid will be made up of two parts of 100 percent sulfuric acid and one part of 100 percent nitric acid.

The ratio of the 4-acetamidobenzoic acid to the total sulfuric acid (including that in the mixed acid) employed in the reaction should be between 20 and 30 parts of 4-acetamidobenzoic acid per 100 parts of total sulfuric acid during the nitration reaction. That is sufficient to maintain a sulfuric acid concentration in the mass during the reaction of from 86 to 92 percent. Too dilute sulfuric acid results in incomplete reaction and poor yields while too concentrated sulfuric acid does not give a sufficiently fluid reaction mass for commercial use. The temperature of the nitration reaction may range from about 0° C. to about 12° C. The preferred temperature range for the nitration reaction is from about 5° C. to about 10° C. This requires cooling of the mass generally by external cooling. At too high a temperature decarboxylation and hydrolysis may occur followed by further nitration resulting in a number of contaminants.

The rate at which the mixed acids are added to the sulfuric acid solution should not be prolonged but should be accomplished in a few hours or as fast as conveniently possible, as long as the mass is held within the temperature range above given. This usually requires from about one hour to five hours. The 4-acetamido-3-nitrobenzoic acid may be isolated by drowning the mass in ice water, under agitation. Conveniently the charge is drowned with from about 1 to 3 times its weight of water. The drowning is effected sufficiently slow to prevent balling of the precipitated material. The 4-acetamido-3-nitrobenzoic acid precipitates as a yellow solid and may be isolated by precipitation and filtering, or it may be deacetylated in situ by warming the drowned slurry 90° C. to 95° C. for from ½ to 4 hours and then cooling and filtering off the 4-amino-3-nitrobenzoic acid.

The following examples are given to more fully illustrate the invention wherein the parts used are by weight unless otherwise specified:

EXAMPLE 1

To 473 parts of approximately 87 to 89 percent sulfuric acid under agitation at or below 20° C. are added slowly over ½ hour 135 parts of 4-acetamidobenzoic acid. The resulting slurry is cooled to 8° C. to 10° C. and 148 parts of a mixed acid mixture (67 parts of 100 percent sulfuric acid and 33 parts of 100 percent nitric acid) are added at this temperature over a 2-hour period and the solution is further stirred at 8° C. to 12° C. for 2 hours. The charge is slowly drowned over 3 hours in 1900 parts of vigorously stirred cool water (10° C. to 15° C.). The slurry is stirred an additional one hour and the precipitated solid is filtered, washed with 2000 parts of water and dried. The 4-acetamino-3-nitrobenzoic acid precipitates as a brown-yellow solid with a melting points of 198° C. to 202° C.

In place of filtering off the 4-acetamido-3-nitrobenzoic acid it may be hydrolyzed substantially quantitatively in the drowned mixture by heating the drowned slurry to 90° C. to 95° C. for 2 hours, cooling, filtering, washing and drying the resulting 4-amino-3-nitrobenzoic acid which is obtained as a yellow solid with a melting point of 278° C. to 282° C. in an overall yield from 4-acetamidobenzoic acid of 74%.

EXAMPLE 2

(A) Effect of temperature and time of addition (1) To 381 g. of 89% sulfuric acid, 100 g. of 4-acetamidobenzoic acid was added in ½ hr., with the temperature being held below 20° C. After stirring 15 min. the temperature was lowered to 10° C. and 111 g. of a mixed acid (67 parts of 100% sulfuric acid and 33 parts of 100% nitric acid) was added in 4 hours, holding the temperature at 8° C. to 10° C. After stirring for ½ hr. at 8° C. to 10° C., the mixture was drowned in 1150 ml. of water at 25° C. to 40° C. The drowned mass was heated to 95° C. to 100° C. for 4 hours to hydrolyze the product to 4-amino-3-nitrobenzoic acid. The slurry was cooled to 25° C. to 35° C., filtered, and washed acid free with water. The cake was dried at 100° C. The yield was 76 g. (74% of theory) of satisfactory product having the following analysis:

Percent $NO_2$ (by $TiCl_3$ method), 25.0%; theory, 25.4%
Neutral equivalent, 182; theory, 182
Percent polynitroanilines by chromatograph [1], 0.7%
Percent 3,5-dinitro-4-aminobenzoic acid, 2.8%

(2) The above experiment was repeated, except that the temperature was held at 12° C. to 14° C. during the addition of the mixed acid. In this case, the yield was

---

[1] Decarboxylated and overnitrated by-product.

72 g. (70% of theory), and the product had the following analysis:

Percent NO₂ by TiCl₃, 27.5%
Neutral equivalent, 194
Percent polynitroanilines, 6.6
Percent 3,5-dinitro-4-aminobenzoic acid, 7.0

This product is not sufficiently pure for further use, e.g., for the manufacture of 3,4-diaminobenzoic acid, an intermediate for pharmaceuticals and fiber reactive dyes.

4-amino-3-nitrobenzoic acid is extremely difficult to purify conventional means, apparently because of its low solubility in commercially practical solvents. Thus we have found it is of extreme importance to obtain a satisfactory product directly from the nitration reaction by the route described in Example 1.

(3) Experiment 1 of Example 2(A) was repeated except that the time of addition of the mixed acid was 7 hours. The yield was 77 g. of crude product (75% of theory) but product purity was lower than desired as shown by the analysis:

Percent NO₂ (by TiCl₃), 28.9%
Neutral equivalent, 191
Percent polynitroanilines, 4.7%
Percent 3,5-dinitro-4-aminobenzoic acid, 2.2%

(4) In an experiment similar to that of Experiment 3 but involving 693 g. of 89% sulfuric acid as reaction medium and an addition time for the mixed acid of 17 hours, the yield was only 47 g. (46.5% of theory) and the product had poor quality as indicated by the analysis:

Percent NO₂ by TiCl₃, 29.5%
Neutral equivalent, 206

The nitrating acid mixture must be added to the acetamidobenzoic acid-sulfonic acid within about one to about five hours if a product is to be prepared of sufficient purity to undergo further reactions necessary to prepare valuable and products.

(B) Effect of sulphuric acid concentration (1) The conditions of the previous Experiment 2(A) (1) were followed except that 393 g. of 79% H₂SO₄ were used as reaction medium. The 4-amino-3-nitrobenzoic acid yield was only 23 g. (22%), because of losses attributable to side reactions. However, when the acid concentration used was above 94% the mixture was surprisingly too thick to stir, thus not suitable for commercial operation.

Therefore, the sulfuric acid which serves to disperse the compound to be nitrated, tending to obviate the hazardous situation and also serves to carry the nitric acid into the reaction zone, must have a certain critical H₂SO₄ content, i.e., from about 86% to about 92% sulfuric acid preferably about 88% to about 90% sulfuric acid. Thus, it can be seen that the time of addition for the nitric-sulfuric acid mixture, the total sulfuric acid concentration, and the temperature during nitration are critically interrelated features of this invention, for clearly the quality of the 4-amino-3-nitrobenzoic acid is dependent upon the properties of the 4-acetamido-3-nitrobenzoic acid.

4-acetamido-3-nitrobenzoic acid is a widely used intermediate for the preparation of other compounds. One important use is for the preparation of quinoxaline compounds, which are in demand as pharmaceuticals and as intermediates in fiber reactive dyes. The acetyl group is hydrolyzed and the nitro group is reduced to an amino group. The diaminobenzoic acid thus obtained is condensed with oxalic acid to form 2,3-dihydroxyquinoxaline-6-carboxylic acid.

It has been shown by the above examples that 4-acetamidobenzoic acid can be nitrated easily in a non-hazardous manner. Good yields of from 72 to 80 percent of 4-acetamido-3-nitrobenzoic acid may be obtained.

As many apparently widely different embodiments of this invention may be made without departing from the spirit and scope thereof, is to be understood that this invention is not limited to the specific embodiments thereof except as defined in the appended claims.

What is claimed is:

1. A process for the preparation of 4-acetamido-3-nitrobenzoic acid which comprises dissolving 4-acetamidobenzoic acid in sulfuric acid and effecting the nitration by the addition of a mixed acid consisting of sulfuric acid and nitric acid within a period of from about 1 to about 5 hours, the amount of nitric acid employed being sufficient to provide 1 to 1.2 moles of nitric acid per mole of 4-acetamidobenzoic acid, and the amount of sulfuric acid employed in the reaction, including that in the mixed acid, being sufficient to give a ratio of between 20 and 30 parts of 4-acetamidobenzoic acid to 100 parts of 100 percent sulfuric acid during the nitration reaction, the sulfuric acid concentration in the mass being maintained at from 86 to 92 percent and maintaining the temperature during nitration in the range of from about 0° C. to about 12° C.

2. A process for the preparation of 4-acetamido-3-nitrobenzoic acid by nitration of 4-acetamidobenzoic acid which comprises dissolving 4-acetamidobenzoic acid in sulfuric acid of from about 86% to about 92% concentration, adding to the solution a nitric acid and sulfuric acid mixture consisting of about 1 to about 1.2 moles of nitric acid per mole of 4-acetamidobenzoic acid, said nitric acid being in the form of a mixed acid consisting of 1 part of 100% nitric acid and 2 parts of 100% sulfuric acid and the amount of sulfuric acid employed in the reaction, including that in the mixed acid, being sufficient to give a ratio of between 20 and 30 parts of 4-acetamidobenzoic acid to 100 parts of 100 percent sulfuric acid during the nitration reaction and maintaining the temperature during nitration in the range of from about 0° C. to about 12° C.

3. A process for the preparation of 4-amino-3-nitrobenzoic acid which comprises nitrating 4-acetamidobenzoic acid by dissolving the 4-acetamidobenzoic acid in sulfuric acid and effecting the nitration by the addition of a mixed acid consisting of sulfuric acid and nitric acid within a period of from about 1 to about 5 hours, the amount of nitric acid employed being sufficient to provide 1 to 1.2 moles of nitric acid per mole of 4-acetamidobenzoic acid, and the amount of sulfuric acid employed in the reaction, including that in the mixed acid, being sufficient to give a ratio of between 20 and 30 parts of 4-acetamidobenzoic acid to 100 parts of 100 percent sulfuric acid during the nitration reaction, the sulfuric acid concentration in the mass being maintained at from 86 to 92 percent and maintaining the temperature during nitration in the range of from about 0° C. to about 12° C.; drowning the mass in water and hydrolyzing the drowned mass by heating at a temperature in the range of from about 90° C. to about 95° C.

References Cited

UNITED STATES PATENTS 3,177,247  4/1965  Ross _____ 260—518
3,296,267  1/1967  Ross.

OTHER REFERENCES

Ber. Chem. (1885), by Kaiser, vol. 18, pp. 2942 to 2952 relied on.

LORRAINE A. WEINBERGER, *Primary Examiner.*

A. THAXTON, *Assistant Examiner.*